May 3, 1932. A. DINA 1,856,069
LOCKING MECHANISM
Filed Aug. 31, 1929 4 Sheets-Sheet 1

INVENTOR
Augusto Dina
BY
Howard W. Dix
ATTORNEY

May 3, 1932.  A. DINA  1,856,069
LOCKING MECHANISM
Filed Aug. 31, 1929  4 Sheets-Sheet 2

INVENTOR
Augusto Dina
BY
Howard W Dix
ATTORNEY

May 3, 1932. A. DINA 1,856,069
LOCKING MECHANISM
Filed Aug. 31, 1929 4 Sheets-Sheet 3

INVENTOR
Augusto Dina
BY
Howard W. Dix
ATTORNEY

May 3, 1932.  A. DINA  1,856,069
LOCKING MECHANISM
Filed Aug. 31, 1929   4 Sheets-Sheet 4

INVENTOR
Augusto Dina
BY
Howard W. Dix
ATTORNEY

Patented May 3, 1932

1,856,069

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

LOCKING MECHANISM

Application filed August 31, 1929. Serial No. 389,839.

This invention relates to new and useful improvements in driving and locking means of universal application.

A main object of the invention is to provide a simple compact, and efficient mechanism whereby an element can be driven preferably by a single driving member from one position to another and automatically and securely locked in position at each end of the path of movement.

A further object is to provide such mechanism as will permit the movable element being securely locked in either extreme position and then unlocked and moved to the other position and locked therein, all accomplished by a simple uni-directional movement of a driving element.

A still further object is to provide means whereby the locking mechanism can be adjusted or reset to accommodate its action to variations in the length of movement of the driven member.

Yet another object is to provide a simple compact mechanism wherein the driving and driven elements and their associated parts are so designed and related that the parts will move in such synchronism that there will be a maximum of resistance to being unlocked but a minimum of resistance to being moved after being unlocked.

Further and more specific objects, features, and advantages will more clearly appear from the detailed description given below when taken in connection with the accompanying drawings which form part of the specification and which illustrate one preferred present form of the invention.

Generally contemplated, the invention comprises a driven member which preferably has a predetermined path of movement. This member is driven from one end of its travel to the other preferably by a single driving member of which a uni-directional effort alone is required for any given path to be traversed. The parts are so designed that as the driven member reaches either end position, the driving mechanism becomes automatically locked so that the driven member is firmly secured in this position. When locked, to move the driven element, it is merely necessary in the preferred construction herein to exert a turning effort on the driving member and effect the unlocking of this element after which continued turning motion of the driver in the same direction will move the driven element to the other end of its travel where automatic synchronous locking takes place.

More particularly, the device comprises a driven element slidable along a support such as two or more rods. Along one of the supports or rods are disposed teeth engaged by a gear on the driver element. This gear is on a shaft turned by a knob or lever or other manually operated member. The gear shaft and knob have longitudinal movement against a spring action which normally tends to force the shaft in one longitudinal direction. The knob has projections adapted to engage in slots, notches, or recesses on the driven member which when in engagement, lock the knob and drive shaft from further turning.

To unlock and drive it it is merely necessary to start turning the knob. The engagement of the projections and recesses is such as to resist disengagement up to certain pressures and beyond that they are forcibly disengaged and the drive shaft can continue its turning movement with slight longitudinal displacement to allow for withdrawal of the projections from the notches or recesses. The parts are so designed that when the driven element has exactly achieved the desired end of its path of movement, the driving element will have been turned so that its projections will fall into the notches to lock the driver securely in place.

Furthermore, the supporting rods may be provided with a worm instead of a gear and the engaging gear may be a worm gear so that whenever the rod is turned, the gear and its shaft can be turned to adjust the driver knob or member in its locking or other position independent of any movement of the driven element. This will permit the device to be locked in other positions of the driven element than its extreme end positions if desired.

Therefore, the only motion required of the driver is a turning movement which initially results in a slight displacement longitudinally of the drive shaft to unlock it and then continues uninterruptedly to forward the driven element in a smooth and continuous manner.

The preferred present form of the invention is illustrated in the drawings, in which Fig. 1 is a vertical longitudinal section through the device taken on the line 1—1 of Fig. 2;

Figure 13:
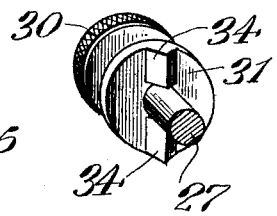
Figure 10:
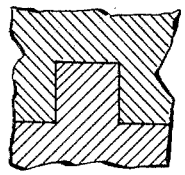
Figure 11:
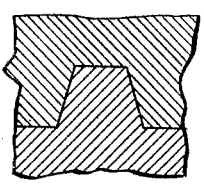
Figure 12:
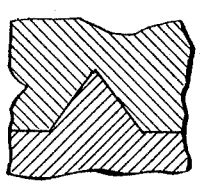

Figs. 10, 11, and 12 are sectional small views of the different forms of interengaging locking members employed; and, Fig. 13 is a perspective view of the operating knob of a preferred form of the invention.

As shown in the drawings, the present preferred form of the invention may comprise a member 10, which may be a plate or other element to be moved. This plate may be formed with collars 11 and 12 which are slidable along a support such as rods 13 and 14. These supports are preferably mounted on brackets such as 15 and 16 having collars 17 and 18 to receive the rods 13 and 14 which may be held therein by means of set screws such as 19 and 20. The brackets are preferably fastened to a supporting partition such as 21 which is mounted on a suitable base member 22.

The collars 11 and 12 are preferably adapted to slide along the rods 13 and 14 between the adjacent edges of the collars 17 and 18 and stop members such as collars 23 and 24 on the outer ends of the rods 13 and 14. Thus the path of travel of the driven element or plate 10 is limited and determined. In order to drive the element 10, the lower collar 12 is cut away to expose a predetermined portion of the rod 14, the upper surface of which is provided with straight rack teeth 25. These teeth are engaged by a gear 26 mounted on a shaft 27 extending at right angles to the rod 14 and parallel to the driven element 10. The shaft 27 is journalled between bosses 28 and 29 mounted on the driven element 10, and the outer end of the shaft 27 has fastened thereon a hand operated member 30 such as a knob having a hub or head 31 lying adjacent the face of the boss 28. A spring 32 is disposed between the opposite face of the boss 28 and a collar 33 on the shaft 27 and tends to move the shaft 27 to the right at all times.

Figure 1:
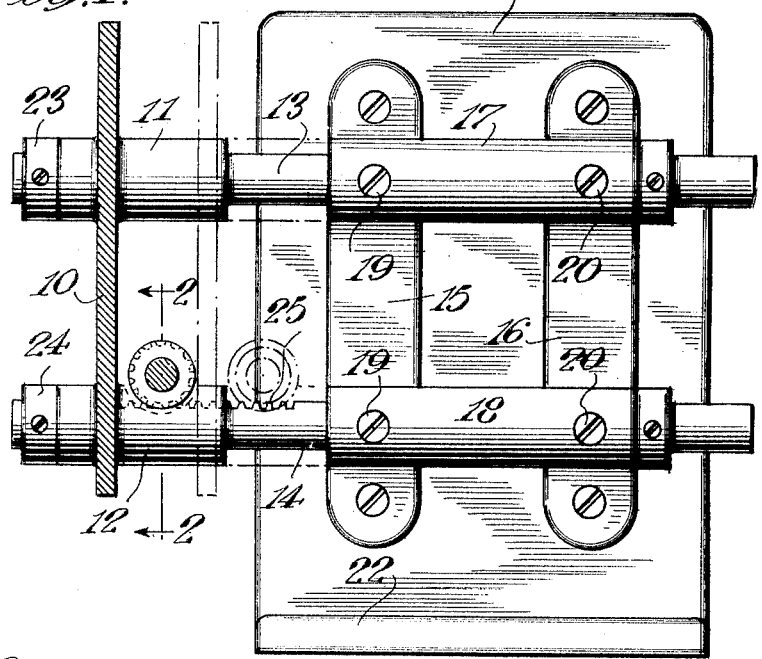
Figure 2:
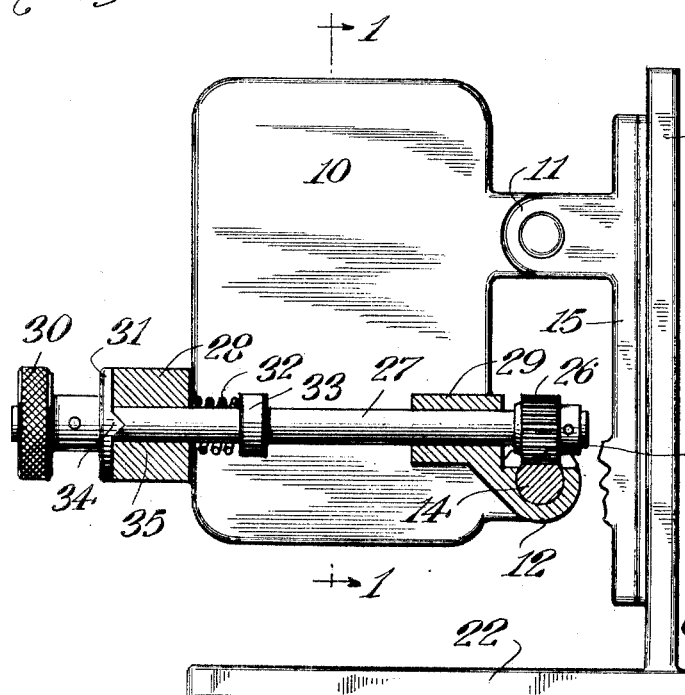
Fig. 2 is a vertical transverse section taken along the line 2—2 of Fig. 1.

The adjacent faces of the hub 31 and the boss 28 are provided with engaging projections such as 34 and notches or recesses 35 which when engaged as shown in Fig. 2, will tend to lock the shaft 27 from movement and lock the knob 30 to the boss 28. It will be observed that there are several of these projections and notches or recesses on the adjacent faces above mentioned and it is to be noted that they may be reversed as to position since the projections could be on the boss 28 and the notches or recesses on the hub 31. Noting the amount of the path of movement of the element 10 and the size of the rack 25 and the gear 26, these parts are so designed, that when the element 10 is in one end position, the projections and the notches will be in engagement and when the element 10 is in the other extreme position, a like engagement will result. There need be only one notch and one projection as long as their position relative to the motion of the other parts is properly designed to cause locking at the desired points.

Figure 3:
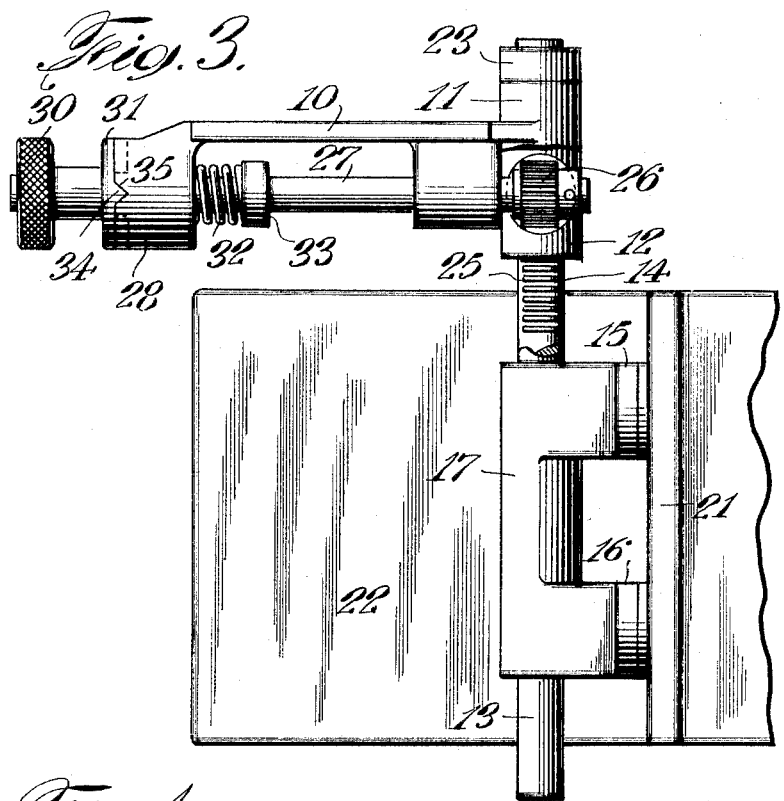
Fig. 3 is a plan view of the device.

With the parts shown in the positions of Figs. 2 and 3 it will be noticed that the element 10 is locked in one end position. To move it from this position to the other end position, it is merely necessary to grasp the knob 30 in the hand and commence turning it. The first movement of the knob will cause the lateral edges of the projection 34 and the engaged notch or recess 35 to slide against each other and acting like a cam, will cause the projection to be moved or displaced longitudinally until it is out of the recess, after which continued turning movement of the knob will turn the shaft 27 and through the gear 26 and the rack 25 will cause the element 10 to move to its other end position. This initial movement of the knob in an angular direction will naturally cause the shaft 27 to be longitudinally displaced against the action of the spring 32 until the projections and notches are cleared of each other but this displacement is not sufficient to unmesh the gear 26 from the rack 25. As previously stated the parts as to dimension are so designed that just as the element 10 reaches its other end position then the projections and notches are ready again to engage and cause an automatic locking of the parts in the manner above set forth.

As shown in Figs. 10, 11 and 12 various types of projections and notches may be employed. The one shown in Fig. 10 involves a right angle sided notch and projection and in this construction it would be necessary to pull the knob out longitudinally before the projection could be cleared of the notch. Thus more than a mere turning movement of the knob would be involved in using this type of locking. In Fig. 11 the sides of the projection and notch are angularly disposed and here the turning movement would cause the unlocking but quite a heavy pressure would have to be involved. Fig. 12 shows the preferred form in which sides are disposed at forty-five degrees to the plane of movement of the adjacent faces of the hub 31 and the boss 28 since the maximum resistance to unlocking is afforded consistent with a not too great effort to unlock and turn the knob.

Figure 4:
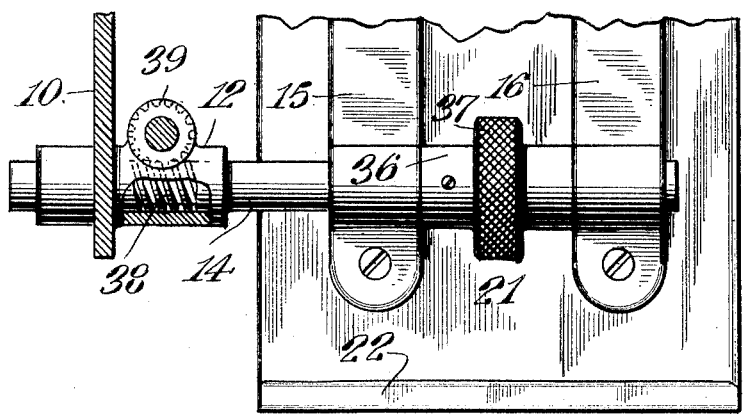
Fig. 4 is a vertical longitudinal section through a modified form of the device.

In the modified form of the invention shown in Fig. 4, it will be seen that the lower rod 14 is between brackets 15 and 16, provided with a sleeve 36 filling the space between the brackets and fastened to the rod and provided with a knurled hand member 37. Thus the rod may be turned but cannot slide longitudinally. The rod 14 instead of having a rack on its outer end is provided with a worm 38 meshing with a worm gear 39 on shaft 27. By turning the knurled member 37 the rod 14 can be turned to operate the worm 38 and cause the turning of the gear 39 and the shaft 27. It will be seen that this movement is possible without moving the element 10 and thus the shaft 27 with its locking elements may be adjusted at any time to cause the parts to lock even before the element 10 has reached its ultimate end position if this result is desired. By having several projections and notches as shown in Fig. 13 therefore locking can take place at a plurality of positions during the movement of the element 10 if desired.

Figure 5:
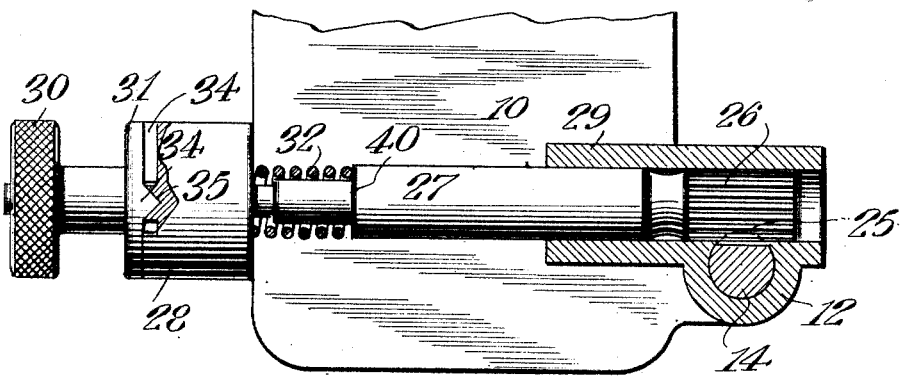
Fig. 5 is an enlarged detail, partly in section, of a modified construction of the drive shaft.

In Fig. 5 a modified construction is shown in which the shaft 27 is made all in one piece with the gear 26, and the spring 32 bears between the face of boss 28 and an integral shoulder 40 formed on the shaft 27.

Figure 6:
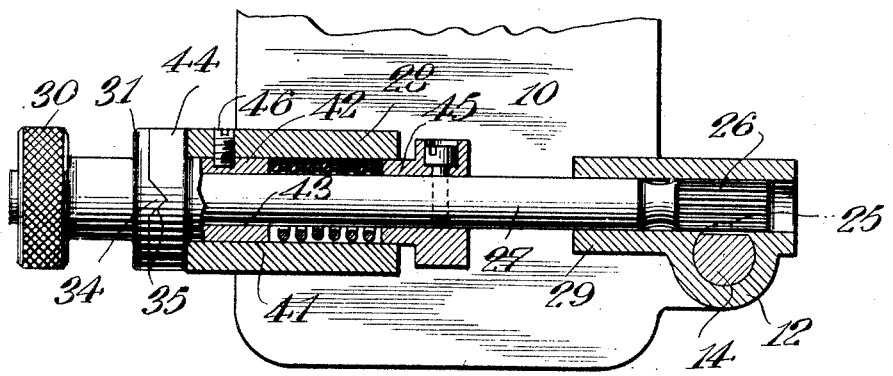
Fig. 6 is a still further modification of the drive mechanism.

In Fig. 6 a still further modification is shown in which the boss 28 has a much larger bore such as 41 which at one end receives a sleeve 42 therein which is of steel and has itself a bore 43 to receive the shaft 27. The sleeve at one end has a flange 44 also of steel which contacts with the hub 31 before mentioned which may be also of steel thus providing a steel to steel contact at this point where the wear is greatest. In the other end of the enlarged bore 41 is housed the spring 32 which bears at one end against the end of the sleeve 42 and at the other end against the end of a collar 45 keyed to the shaft 27. This collar can lie close to the boss 28 and partly enter the enlarged bore thereof to practically enclose the spring and make a dirt-proof connection. In this modification the boss 28 and sleeve 42 are tied together by a screw or key 46.

Figure 7:
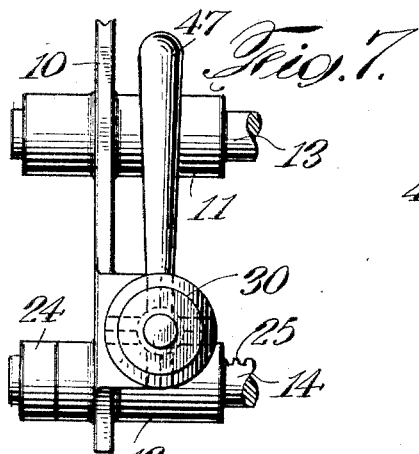
Fig. 7 is an elevation of modified form of operating member.
Figure 8:
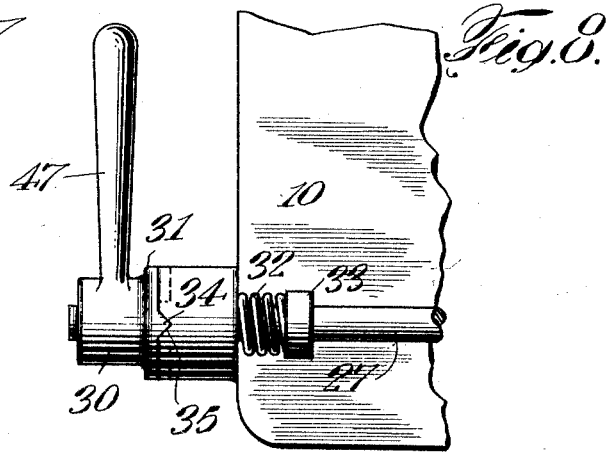
Fig. 8 is a side view thereof.

In the modification shown in Figs. 7 and 8 instead of a knob 30 there is employed a handle 47 to operate the shaft 27.

Figure 9:
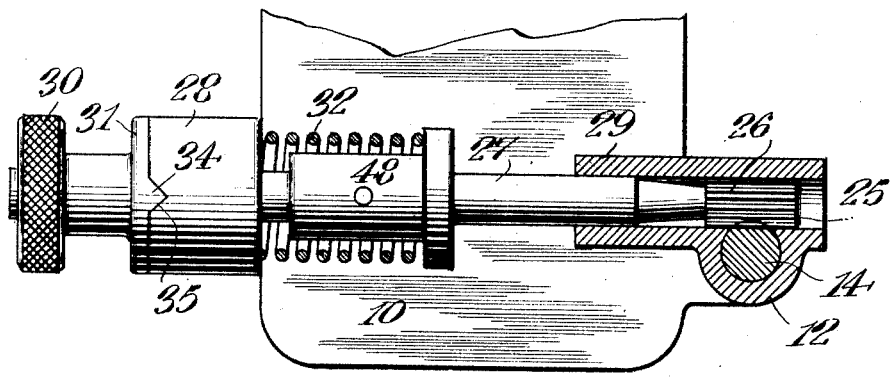
Fig. 9 is a partial sectional view of a still further modified form of drive mechanism.

In the modification shown in Fig. 9 a large flanged sleevelike collar 48 is keyed to the shaft 27 and the spring 32 between it and the face of the boss 28 as shown.

In résumé it will be seen that when the parts are in the position shown in Fig. 3 with the element 10 locked in one of its end positions, no normal movement can occur to it without turning the shaft 27. Therefore it is securely locked against accidental or working jars, vibrations and the like, and against any positive pushing against it face. To start it from this position, however, it is merely necessary to commence turning on the knob 30. The initial movement thereof as above explained will automatically cause a slight displacement longitudinally of the shaft 27 to withdraw the projections and notches from each other and a further continuing of the turning movement will drive the element 10 to the other end of its predetermined path. If during the movement it is desired to lock the element 10 in an intermediate position, then with the construction shown in Fig. 4, the turning of the rod 14 will permit the shaft 27 to be turned independent of the element 10 and cause the locking to take place at that point as above described. This construction, therefore, will afford the maximum resistance to unlocking possible with any similar arrangement of parts but will afford, when unlocked, a smooth running and simple driving mechanism. The synchronous operation and design of the parts is such that automatic locking takes place merely by the turning of the knob to move the element 10 from one position to the other.

While the invention has been described in detail and with respect to a present preferred form thereof, it is to be understood that it is not to be limited to such details and forms since many changes and modifications may be made and the invention embodied in other forms without departing from the spirit and scope of the invention in its broader aspects. Hence it is desired to cover all forms and modifications coming within the language or scope of any one or more of the appended claims.

What is claimed is:

1. A driving and locking device which comprises a driven member, a member for driving said driven member between predetermined limits, means for automatically locking said members together in predetermined positions of the driven member, and means whereby the locking and unlocking of said members and the movement of the driven member by the driving member is effected by a continuous movement of the driving member in either direction.

2. A driving and locking device which comprises a driven member, a driving member, means permitting one member to drive the other by a continuous movement in either direction, and means for automatically locking said drive member to the driven member at predetermined points in the movement of the driven member in either direction.

3. A driving and locking device which comprises a driven member having a predetermined limited path of movement, a driving member, means whereby the driving member may move the driven member by a continuous movement in either direction, and means whereby the parts are so synchronously operated that when the driven member reaches the end of its path of movement in either direction the driving member will be automatically locked to the driven member against further movement.

4. A driving and locking device comprising a driven member, a support on which it is moveably mounted, means on the support for limiting the movement of the driven member between predetermined points, a drive member on said driven member and engaging the support, said driving member adapted to be given a movement in one direction or another in a continuous manner to move the driven member along the support, and means whereby the driving member is automatically locked to the driven member when the driven element reaches a predetermined point in its travel in either direction.

5. A driving and locking device which comprises a driven member, a support on which it is slidably mounted, a drive shaft on the driven member, means whereby the drive shaft and the support are engaged for driving the driven member along the support, means for locking the drive shaft to the driven member in predetermined positions of the driven member, and means whereby the drive shaft is unlocked from the driven member upon the initiation of movement to the drive shaft in either direction, and means whereby the continuation of such movement will move the driven member along the support.

6. A driving and locking device which comprises a driven member, a support on which it is slidably mounted, a drive shaft on the driven member, means whereby the drive shaft and the support are engaged for driving the driven member along the support, means for locking the drive shaft to the driven member in predetermined positions of the driven member, means whereby the drive shaft is unlocked from the driven member upon the initiation of movement to the drive shaft in either direction, means whereby the continuation of such movement will move the driven member along the support, and means whereby the drive shaft will automatically be locked to the driven member again when the driven member has reached another predetermined point in its travel in either direction.

7. A driving and locking device which comprises a driven member, a support on which it is slidable, a rack on said support, a drive shaft on the driven member, a gear on said shaft, means for turning said drive shaft, means for locking said shaft to the driven member in predetermined positions of the driven member, and means whereby the locking means is released by the same turning movement which moves the driven member along the support in either direction.

8. A driving and locking device which comprises a driven member, a support on which it is slidable, a rack on said support, a drive shaft on the driven member, a gear on said shaft, means for turning said drive shaft to move the driven member along the support, interengaging projections and notches on the drive shaft and the driven member to lock the drive shaft to the driven member in predetermined positions of the driven member, said interengaging projections and notches permitting release of their engagement by the initiation of the same movement which drives the driven member along the support.

9. A driving and locking device which comprises a driven member, a support on which it is slidable, a rack on said support, a drive shaft on the driven member, a gear on said shaft, means for turning said drive shaft to move the driven member along the support, interengaging projections and notches on the drive shaft and the driven member to lock the drive shaft to the driven member in predetermined positions of the driven member, means tending at all times to hold the projections and notches in engagement, said interengaging projections and notches being shaped to permit release of their engagement by the initiation of the same turning movement of the drive shaft which moves the driven member along its support, the design of the parts being such that as the driven member reaches the end of its travel in a given direction, the projections and notches will be in position to again engage and lock the drive shaft to the driven member.

10. A driving and locking device which comprises a driven member, a support on which it is slidable, a rack on said support, a drive shaft on the driven member, a gear on said shaft, means for turning said drive shaft to move the driven member along the support, interengaging projections and notches on the drive shaft and the driven member to lock the drive shaft to the driven member in predetermined positions of the driven member, means tending at all times to hold the projections and notches in engagement, said interengaging projections and notches shaped to permit release of their engagement by the initiation of the same turning movement of the drive shaft which moves the driven member along the support, the design of the parts being such that as the driven member reaches the end of its travel in a given direction, the projections and notches will be in position to again engage and lock the drive shaft to the driven member, and means whereby the drive shaft can be adjustjusted independently of a movement of the driven member.

11. A driving and locking device which comprises a driven member, a rod on which said member is slidably supported, a rack on said rod, a driving shaft on said member, a gear on said driving shaft meshing with the rack, a manually operated member on the drive shaft to enable it to be turned, said manually operable member and driven member having interengaging projections and notches, and means causing the engagement of said projections and notches when the driven member has arrived at predetermined points of its travel.

12. A driving and locking device which comprises a driven member, a rod on which said member is slidably supported, a rack on said rod, a driving shaft on said member, a gear on said driving shaft meshing with the rack, a manually operated member on the drive shaft to enable it to be turned, said manually operable member and driven member having interengaging projections and notches, and means causing the engagement of said projections and notches when the driven member has arrived at predetermined points in its travel, and means whereby the locking and unlocking of said projections and notches, and the movement of the driven member by the turning of the drive shaft is effected by a single continuous unidirectional movement of the driven member.

In testimony whereof I have hereunto set my hand.

AUGUSTO DINA.